G. E. OUTLAW.
NUT LOCK.
APPLICATION FILED JUNE 20, 1917.
1,303,715.
Patented May 13, 1919.
2 SHEETS—SHEET 1.
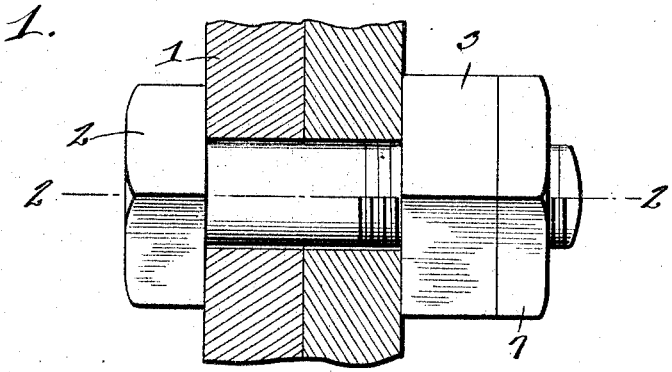
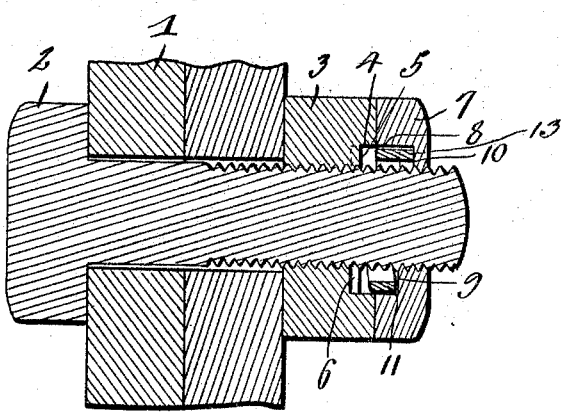
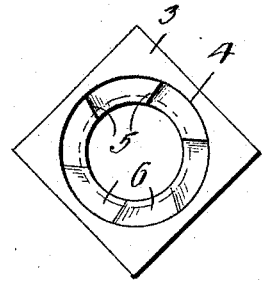
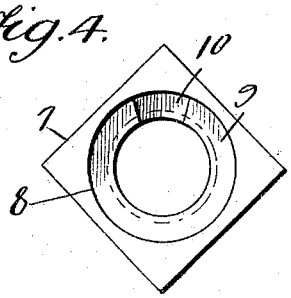
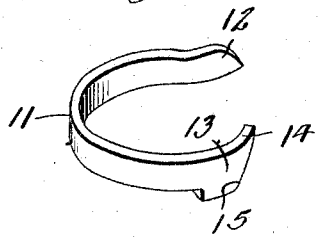
WITNESSES
INVENTOR
G. E. Outlaw,
BY Victor J. Evans
ATTORNEY G. E. OUTLAW.
NUT LOCK.
APPLICATION FILED JUNE 20, 1917.
1,303,715.
Patented May 13, 1919.
2 SHEETS—SHEET 2.
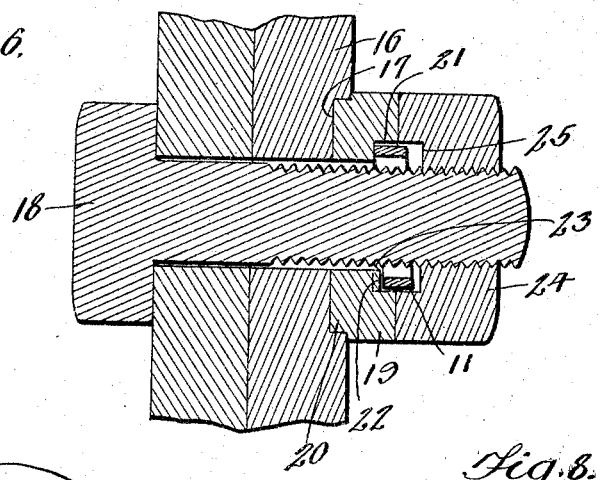
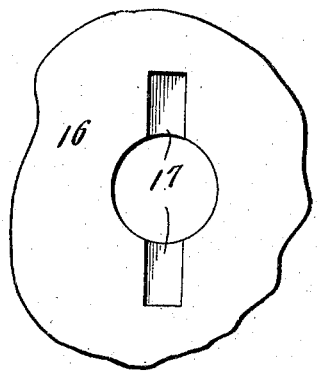
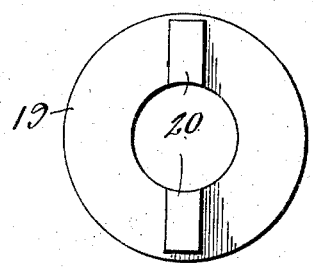
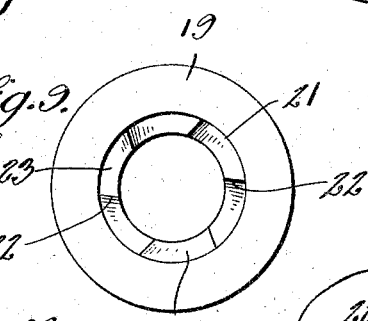
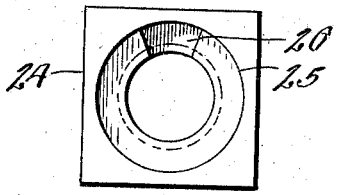
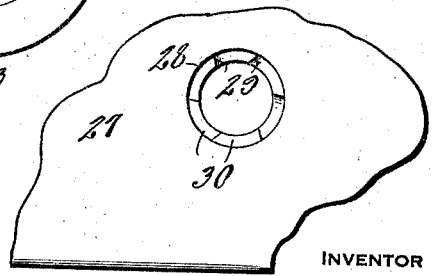
WITNESSES
INVENTOR
G. E. Outlaw,
BY Victor J. Evans
ATTORNEY

UNITED STATES PATENT OFFICE.

GEORGE E. OUTLAW, OF VAUGHN, NEW MEXICO.

NUT-LOCK.

1,303,715. Specification of Letters Patent. Patented May 13, 1919.

Application filed June 20, 1917. Serial No. 175,963.

*To all whom it may concern:*

Be it known that I, GEORGE E. OUTLAW, a citizen of the United States, residing at Vaughn, in the county of Guadalupe and State of New Mexico, have invented new and useful Improvements in Nut-Locks, of which the following is a specification.

This invention relates to improvements in means for locking a nut upon a bolt, and an object of the invention is to provide a device of this character, which shall be of a comparatively simple construction, wherein the locking means between the nut and the element contacted by the nut is fully concealed, so that the same can not be surreptitiously tampered with and also so that the same is fully protected from the weather.

A further object of the invention is to produce a means for locking a nut upon a bolt comprising a spring element designed to exert a tension between the nut and the object contacted by the nut when the said nut is screwed home upon the bolt, whereby to cause the threads of the nut to frictionally engage with the threads of the bolt so that accidental separation of the nut from the bolt will be prevented, the arrangement being such as to permit of the said separation of the nut from the bolt should occasion require.

With the foregoing objects in view and others which will appear as the nature of the invention is more fully understood, the improvement resides in the construction, combination and operative arrangement of parts set forth in the following description and falling within the scope of the appended claim.

The drawings illustrate a satisfactory reduction of the improvement to practice, and in the said drawings, Figure 1 is a side elevation illustrating one form of the improvement, the super-structure connected by the bolt and nut being in section.

Fig. 2 is a longitudinal sectional view approximately on the line 2—2 of Fig. 1.

Fig. 3 is an elevation, upon an enlarged scale, looking toward the outer face of the inner nut.

Fig. 4 is a similar view looking toward the inner face of the outer nut.

Fig. 5 is a perspective view of the spring lock.

Fig. 6 is a longitudinal sectional view through a modified form of the construction.

Fig. 7 is a plan view of the plate or super-structure engaged by the washer in the modified form of construction.

Fig. 8 is a plan view of the washer looking toward the inner face thereof.

Fig. 9 is a similar view of the washer looking toward the outer face thereof.

Fig. 10 is a plan view looking toward the inner face of the nut.

Fig. 11 is a view of a portion of a fish plate having its bolt openings surrounded by a rounded depression and the inner wall of the said depression being provided with teeth, and illustrating a means whereby the inner nut member or washer may be dispensed with.

In the drawings, and also particularly in Figs. 1 to 4 thereof, the plates or super-structure are illustrated as connected by a bolt and the said bolt locked in plate connecting or securing position in accordance with the present invention.

The plates are indicated by the numerals 1, and the bolt by the numeral 2. The locking means, comprise, in this instance, an inner nut member 3, which is threaded upon the bolt and which contacts with the outer plate of the super-structure. The nut 3 is of the ordinary construction except that the same has its outer face provided with an annular depression 4 surrounding the bore thereof, and the inner wall provided by the said depression is formed with shoulders 5 and annular walls 6 arranged between and connecting the shoulders. In addition to the inner nut 3 an outer nut 7 is employed which may be of a less thickness than the inner nut 3, so that the bore of the same is provided with comparatively few threads, and the inner face of the outer nut 7 is provided with an annular depression 9 surrounding its bore and the inner wall provided by the said depression is notched as at 10.

The locking element is broadly indicated by the numeral 11 and is in the nature of a flat split ring of helical formation, and one of the ends thereof may and preferably is formed with a downturned extension 12 providing what may be termed a tooth and the said tooth is designed to engage with one of the shoulders 5 in the depression 4 of the nut 3. By reference to the drawings, it will be noted that the ends of the locking member 11 are spaced a suitable distance apart, and the end of the said member, opposite that provided with the extension or tooth 12 is widened forming the same with what I will term a head 13, the inner edge of this head being straight as indicated by the character 14, but the outer end of the head as well as the end proper of the locking element is beveled as at 15, and the purpose of this arrangement will presently be apparent.

In locking the nut members to the bolt, the nut 3 is first screwed home upon the bolt. The helical spring locking member is then arranged in the annular depression 4. The outer nut member 7 is then screwed upon the bolt 2 until the head 13 of the locking member is received in the depression 8 of the said member 7. A further turning of the nut 7 will cause the head to be received in the notch 10 provided upon the inner wall 9 of the depression 8, and until the nut 7 is screwed into contacting engagement with the nut 3, the locking element 11 will turn with the said nut 7, the toothed end of the same ratcheting over the annular walls 7 and shoulders 5, causing the opposite ends of the helical member to be brought together and also causing the said ends to exert a pressure in the opposite direction, or in other words, against the respective nut members 3, and 7, the threads in the bore of the said nuts 3 and 7 will frictionally contact with the threads of the bolt, so that an accidental removal of the nut members from the bolt will be prevented. When, however, it is desired, that the nuts be removed from the bolt, a strong pressure upon the nut 7, in an unscrewing direction, will cause one of the ends of the notch 10 to ride over the beveled end 15 of the locking member and consequently permit of the separation of first the member 7 and thereafter the nut member 3.

In Figs. 6 to 19, the outer plate 16 of the superstructure is provided with diametrically opposite notches 17 which communicate with the opening through which the bolt 18 passes, and in this instance, in lieu of the inner nut member 3, I employ a washer 19 which has its inner face provided with spaced lugs 20 designed to engage in the notches 17. The washer is, of course, provided with a round opening through which the bolt 18 passes, and the said washer, upon its outer face is provided with an annular depression 21, the inner wall of which being provided with spaced shoulders 22 and angular walls or surfaces 23 connecting the shoulders, the arrangement being similar to that disclosed in Fig. 3 of the drawings. The locking element is also similar, and the outer member or notch 24 has upon its inner face an annular depression 25 surrounding the bolt thereof, and the inner wall of the said depression is provided with a notch 26, similar to the notch 10 in the member 7, and the locking element 11 is arranged and performs its functions exactly in the same manner as has been previously described.

In Fig. 11 of the drawings, I have illustrated a portion of a fish plate which is designated by the numeral 27 and have depressed the same upon its outer face, the said depression being annular and surrounding the bolt opening, and the inner wall of this depression, indicated by the numeral 28 is provided with spaced shoulders 29 and annular walls or surfaces 30 connecting the said shoulders. By this arrangement it will be noted that both the inner nut 3 and the washer member 19 may be dispensed with, and from the foregoing description, when taken in connection with the drawings, the simplicity and advantages of the construction, will, it is thought, be apparent without further detailed description.

Having thus described the invention, what I claim is—

In combination with a bolt and an element through which the bolt passes, said element having an annular depression upon its outer face surrounding the bolt, and the inner wall of the said depression being formed with spaced shoulders and angular walls connecting the shoulders, a nut threaded upon the bolt and having its inner face provided with an annular depression surrounding the bore thereof, and the inner wall of the said depression having a notch, a split spring ring of helical formation having one of its ends outturned to provide a tooth to engage with one of the shoulders of the referred to element, when the said split ring is arranged between the element and the nut, said ring having its opposite end provided with an outturned portion forming a head designed to be engaged in the notch of the nut, and the end of the said head being beveled to the end of the ring upon which the head is formed, as and for the purpose set forth.

In testimony whereof I affix my signature.

GEORGE E. OUTLAW.

Copies of this patent may be obtained for five cents each, by addressing the "Commissioner of Patents, Washington, D. C."